United States Patent
Gruber (10) Patent No.: US 12,483,982 B2
(45) Date of Patent: Nov. 25, 2025

(54) WIRELESS SENSOR TRANSMISSION METHOD AND APPARATUS

(71) Applicant: Universal Electronics Inc., Scottsdale, AZ (US)

(72) Inventor: Brandon Gruber, Carlsbad, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

(21) Appl. No.: 16/691,144

(22) Filed: Nov. 21, 2019

(65) Prior Publication Data

US 2021/0160777 A1     May 27, 2021

(51) Int. Cl.
| | |
|---|---|
| *H04W 52/02* | (2009.01) |
| *G06F 1/3212* | (2019.01) |
| *H04L 1/00* | (2006.01) |
| *H04L 5/00* | (2006.01) |
| *H04W 12/037* | (2021.01) |
| *H04W 84/18* | (2009.01) |

(52) U.S. Cl.
CPC ...... *H04W 52/0229* (2013.01); *G06F 1/3212* (2013.01); *H04L 1/0047* (2013.01); *H04L 5/0044* (2013.01); *H04L 5/0055* (2013.01); *H04W 12/037* (2021.01); *H04W 84/18* (2013.01)

(58) Field of Classification Search
CPC ........... H04W 52/0229; H04W 12/037; H04W 84/18; H04L 5/0055; H04L 1/0047; H04L 5/0044; G06F 1/3212
See application file for complete search history.

(56) References Cited

U.S. PATENT DOCUMENTS

| | | | | |
|---|---|---|---|---|
| 6,167,137 | A  * | 12/2000 | Marino | H04W 12/04 380/255 |
| 9,860,839 | B2 * | 1/2018 | Kates | G08B 21/182 |
| 2010/0031036 | A1* | 2/2010 | Chauncey | H04W 12/033 713/168 |
| 2011/0260884 | A1* | 10/2011 | Yi | G07C 5/008 340/870.02 |
| 2015/0187209 | A1 | 7/2015 | Brandt | |
| 2015/0281954 | A1 | 10/2015 | Warren | |
| 2016/0247370 | A1* | 8/2016 | Lamb | G08B 13/08 |
| 2016/0323972 | A1* | 11/2016 | Bora | H05B 47/11 |
| 2016/0373917 | A1 | 12/2016 | Logue et al. | |
| 2017/0171728 | A1 | 6/2017 | Aiuto et al. | |
| 2018/0247475 | A1* | 8/2018 | Archbold | E05F 15/668 |

(Continued)

FOREIGN PATENT DOCUMENTS

BR     PI0610771 B1 *  9/2019
WO    WO-2015170022 A1 * 11/2015 ......... H04L 12/2827

OTHER PUBLICATIONS

Cano et al., Evolution of IoT: An Industry Perspective, IEEE Internet of Things Magazine, pp. 12-17, Dec. 2018 (Year: 2018).*

(Continued)

*Primary Examiner* — Michael Thier
(74) *Attorney, Agent, or Firm* — Greenberg Traurig, LLP (57) ABSTRACT

Methods and apparatus are described for transmitting messages by sensors in a system, such as a home security system. The messages are deemed received only when a sensor receives both an acknowledgement and a response from a central controller, and retransmissions occur when either an acknowledgement or a response is not received.

2 Claims, 7 Drawing Sheets

(56) References Cited

U.S. PATENT DOCUMENTS

2019/0173673 A1* 6/2019 Nix ...................... H04L 9/3247
2019/0253243 A1* 8/2019 Zimmerman ........... H04W 4/80
2019/0378476 A1* 12/2019 Jeon ...................... G06N 20/00

OTHER PUBLICATIONS

Ghenghea et al., Wireless Sensor Network Interface for a Residential Monitoring System, dated Oct. 2020, 5 pages.
ISA/US, International Search Report and Written Opinion issued on PCT application No. PCT/US20/60515, dated Feb. 10, 2021, 18 pages.
JFR; Nobriot; BBR; Dewassie, Z-Wave Application Command Class Specification, Silicon Labs, silabs.com, 658 pages, dated Oct. 10, 2019.
JFR; Nobriot; BBR; Dewassie, Z-Wave Transport-Encapsulation Command Class Specification, Silicon Labs, silabs.com, 150 pages, dated Oct. 10, 2019.
EPO, extended European search report issued on European patent application No. 20890110.8 dated Nov. 4, 2022, 8 pages.

\* cited by examiner

FIG. 4 – MULTI COMMAND ENCAPSULATED COMMAND

FIG. 5 - SUPERVISION GET COMMAND

FIG. 6 - Z-WAVE 700 SERIES FRAMES

WIRELESS SENSOR TRANSMISSION METHOD AND APPARATUS

BACKGROUND

I. Field of Use

The present application relates to the field of wireless sensing technologies. More specifically, the present application relates to a wireless transmission protocol used by wireless sensors.

II. Description of the Related Art

Wireless sensors are used to detect a wide variety of remote, physical conditions, such as the status of a door or window (i.e., open, closed), the occurrence of motion, the presence of heat, ambient temperatures, vibration, glass breakage, thermal readings, light detection, etc. Such sensors find widespread application in a variety of industries, including home security, home automation and industrial HVAC. These sensors are often wireless, battery-powered devices, enabling them to be placed in remote locations around a home or industrial setting.

Until recently, in order to preserve battery life, sensors were designed as transmit-only devices, i.e., they did not contain a receiver, due to the additional power consumption required by such a receiver. However, recent technological improvements have made battery-powered, two-way sensors (comprising a transmitter and a receiver), a reality. For example, new Z-Wave® 700 series transceiver chips are available from Silicon Laboratories, Inc. of Austin, Texas that contain both a transmitter and a receiver and consume very low power during operation.

The Z-wave 700 series transceiver chips operate in accordance with a Z-wave 700 series communication protocol offered by Silicon Laboratories, Inc., headquartered in Austin, Texas, that allows sensors to relay information over relatively large distances. Sensors that operate in this way are commonly referred to as "mesh" sensors that operate together with other mesh sensors to form a "mesh" network. Other common mesh network technologies include the well-known Zigbee® and Insteon® technologies.

Many wireless communication protocols utilize acknowledgement messages, known as "ACKs", to allow a transmitter to know whether a message transmitted by the transmitter was received by a receiver. Retransmissions are possible, however in battery-powered sensors, each time that a retransmission occurs, the battery life is diminished.

It would be desirable to transmit messages by wireless sensors that maximize battery life while ensuring that messages are received.

SUMMARY

The embodiments described herein relate to methods, systems, and apparatus for efficient message transmission by sensors in a system, such as in a home security system, industrial monitoring system, or any system comprising a central controller in communication with one or more wireless sensors.

In one embodiment, a wireless sensor is described, comprising a detector for detecting an event in proximity to the wireless sensor, a memory for storing processor-executable instructions, a mesh-network transceiver for transmitting information to and receiving information from a controller, either directly or via another wireless security sensor or a repeater, a processor, coupled to the detector, the memory and the mesh-network transceiver, for executing the processor-executable instructions that causes the processor to determine that the event has occurred via a signal received from the detector. In response to determining the event has occurred, generate an encrypted frame, comprising an unencrypted identification of the wireless security sensor and an encrypted event identification that identifies the type of event that has occurred, transmit the encrypted frame, receive an acknowledgement from the controller that the encrypted frame was received, and receive a response from the controller that the frame was decrypted successfully.

In another embodiment, a method is described, performed by a wireless sensor, for efficient message transmission by the wireless sensor, comprising determining that the event has occurred via a signal received from the detector. In response to determining that the event has occurred, generating an encrypted frame, comprising an unencrypted identification of the wireless security sensor and an encrypted event identification that identifies the type of event that has occurred, transmitting the encrypted frame, receiving an acknowledgement from the controller that the encrypted frame was received, and receiving a response from the controller that the frame was decrypted successfully.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present application relates to a system, method and apparatus for efficient message transmission by wireless sensors. While the remainder of this disclosure discusses an embodiment of the invention in the context of a home security system and, specifically, a home security door/window sensor, it should be understood that the principles described herein could be used in other types of sensors, such as motion, temperature, pressure, humidity, vibration, shock, and other wireless sensor types.

Figure 1:
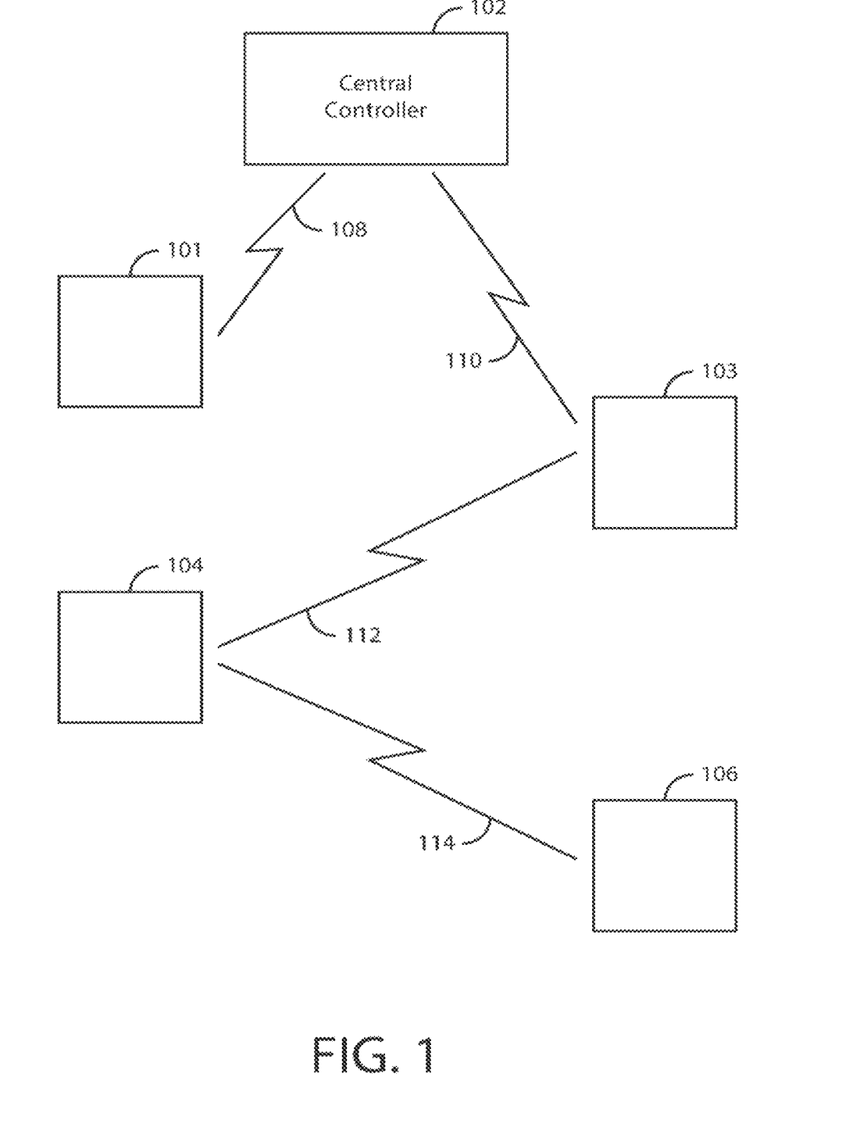
FIG. 1 is a simplified block diagram of a security system comprising a central controller in wireless communication with a number of devices.

FIG. 1 is a simplified block diagram of a security system 100 comprising a central controller 102 in wireless communication with a number of devices 101, 103, 104, and 106, either directly (as shown by wireless signal 108) or indirectly (as shown by wireless signals 110, 112 and 114). In some embodiments, two-way communications between/among central controller 102 and one or more devices is possible while in other embodiments, only one-way communications are possible. In the embodiment shown in FIG. 1, two-way communications are possible between/among central controller 102 and the devices.

Security system 100, utilizing indirect communications as shown, may be referred to as a "mesh" network. A mesh network provides for relaying messages between and among devices, or "nodes", in order to extend the range of the network. In FIG. 1, device is out-of-range from communicating directly with central controller 102, but may nevertheless communicate with central controller 102 via device 103, which relays messages between device 104 and central controller 102. Similarly, device 106 communicates with central controller 102 via device 104 and 103. As such, in general, each device in system 100 is capable of both transmitting and receiving messages from other devices and/or central controller 102.

The devices shown in FIG. 1 may comprise one or more different types of security sensors (door or window sensors, motion detectors, garage door tilt sensors, glass break sensors, etc.) and one or more "repeaters" that are typically AC-powered devices whose sole function is to relay messages between devices. In FIG. 1, device 103 is such a repeater, device 101 comprises a garage door tilt sensor, device 104 comprises a door/window sensor and device 106 comprises a motion sensor. While only three types of sensors are shown in FIG. 1, and only one of each sensor type, typically a plurality of door/window sensors are used in a security system, each to monitor a particular door or widow, and in some cases, more than one motion detector is used to detect motion in more than one area of a home or business. Additionally, other types of sensors could be used, such as one or more glass break sensors, shock sensors, cameras, etc. Finally, other components could be used in system 100, such as one or more remote keypads that can arm and disarm system 100, audio smoke alarm detectors, etc. Each one of the aforementioned components may embody the transmission efficiency techniques discussed herein.

Door/window sensor 104 is used for monitoring a status of a door or a window, such as when the door or window is opened or closed and, in some embodiments, when a door or window is locked or unlocked. In one embodiment, door/window sensor 104 comprises a well-known reed-switch and magnet combination, where door/window sensor 104 detects door or window movement as the reed switch changes state when the magnet is moved via door or window movement. In other embodiments, other techniques are used to determine that status of a door or a window, such as using an accelerometer to determine door or window movement.

When a door/window event occurs, door/window sensor 104 transmits an event signal comprising an encrypted data packet or "frame" to central controller 102, either directly or through one or more other devices in system 100. The event signal comprises an identification of a sensor that transmitted the event signal (such as its serial number, a pre-assigned string of numbers and/or letters such as a NodeID in an embodiment where a Z-Wave® protocol is used, or some other unique identifier), and an event type indicating the type of event that occurred (i.e., door open, window closed, etc.). Door/window sensor 104 may, in addition, transmit encrypted status messages, either at predetermined times or in response to a request from central controller 102. Such encrypted status messages indicate whether a door or a window is currently open, closed, locked and/or unlocked, etc.

After transmitting an event signal or status signal, door/window sensor 104 waits a predetermined, configurable amount of time to receive an acknowledgement message, or ACK, from central controller 102 to ensure that the signal was successfully received by central controller 102. After an ACK is received, door/window sensor 104 waits a predetermined, configurable amount of time to receive a response from central controller 102, indicating that the encrypted event signal or status signal was successfully decrypted. If either the ACK or the response is not received with the configurable, predetermined time limits, door/window sensor 104 may retransmit the signal. This process may be repeated a configurable number of times, as described in more detail later herein.

Central controller 102 comprises a security panel, which is a well-known device used to monitor all of the sensors in system 100, and also may be used to notify one or more persons when an event is detected by one of the sensors. For example, if a door monitored by door/window sensor 104 is opened, door/window sensor 104 transmits a message to central controller 102 via repeater 103 indicative of the event, e.g., that a door has been opened. In response, when security system 100 is armed, central controller 102 may cause a siren located inside and/or outside a premises monitored security system 100 to produce a very loud, audible siren, to cause one or more lights to turn on, to lock or unlock one or more wireless locks, etc. Alternatively, or in addition, central controller 102 may send an alert to a remote monitoring station that monitors thousands of security systems in order to dispatch relevant authorities when an alarm is received from one of the security systems, typically after verification of the event by an employee of the remote monitoring station.

In some embodiments, the functionality of central controller 102 may be performed by a server located in "the cloud", i.e., a server coupled to a gateway device within a home or business via the Internet. In this embodiment, the gateway device receives event signals from the sensors in system 100 and forwards them to the Internet-based server. The server processes the signals and, as a result, may send commands to the gateway device, such as commands that cause the gateway device to activate a loud siren, to cause one or more lights to turn on, to lock or unlock one or more wireless locks, etc. The server could, additionally, notify a remote monitoring station of events that occur. Thus, references made to "central controller 102" herein shall also include Internet-based processing devices, such as the cloud-based server.

Figure 2:
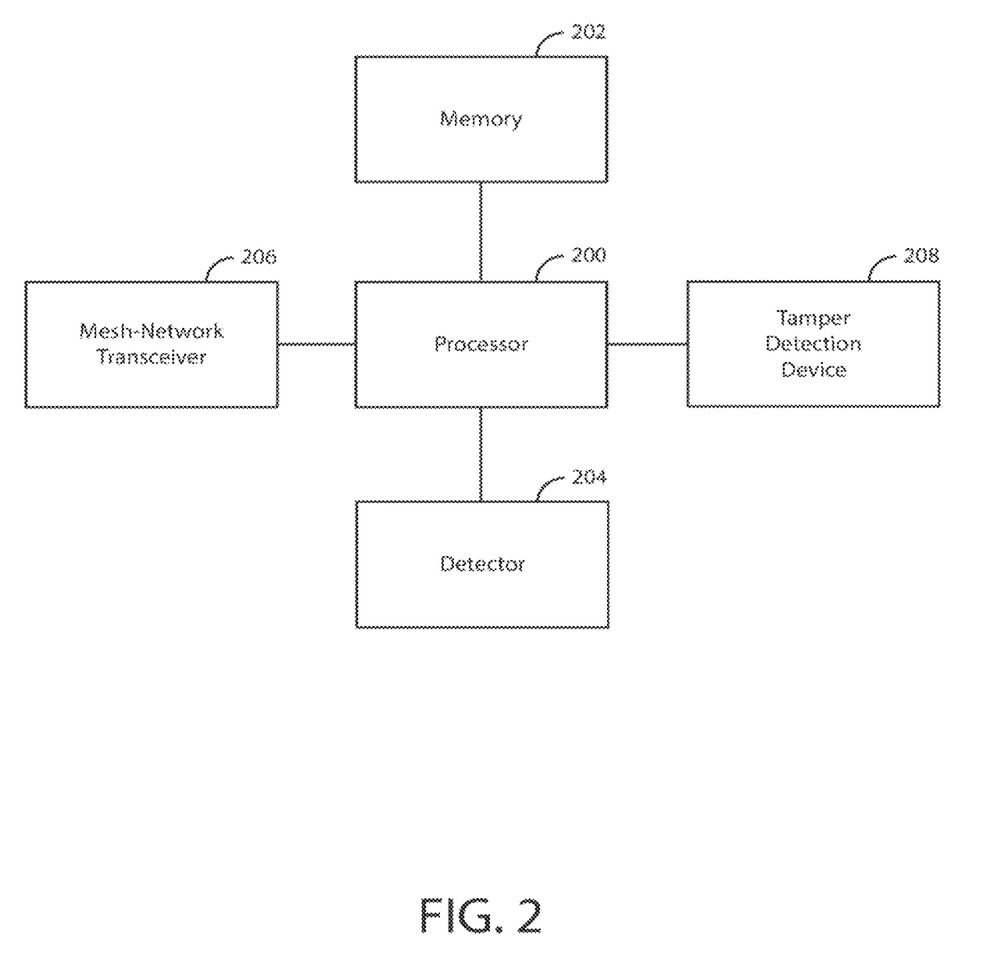
FIG. 2 is a functional block diagram of one embodiment of one of the devices of FIG. 1, in this embodiment, shown as a door or a window sensor, in accordance with the teachings herein.

FIG. 2 is a functional block diagram of one embodiment of door/window sensor 104 in accordance with the teachings herein. Specifically, FIG. 2 shows processor 200, memory 202, detector 204, mesh-network transceiver 206, and tamper detection device 208. It should be understood that the functional blocks may be coupled to one another in a variety of ways, and that not all functional blocks necessary for operation of door/window sensor 104 are shown (such as a battery), for purposes of clarity. It should be further understood that sensors other than a door/window sensor could comprise the same or similar functional blocks as shown in FIG. 2, each having a different detector 204 and different processor-executable instructions stored in memory 202. For example, in a door/window embodiment, detector 204 may comprise a reed switch and magnet combination, but in a motion detector, detector 204 may comprise a passive infrared detector, a tilt sensor in a garage door sensor, a lens/camera in a digital camera, a microphone in a glass break sensor, an accelerometer for a shock sensor, etc.

Processor 200 is configured to provide general operation of the door/window sensor 104 by executing processor-executable instructions stored in memory 302, for example, executable code. Processor 200 may comprise a general purpose processor, such as an ADuC7024 analog microcontroller manufactured by Analog Devices, Inc. of Norwood Massachusetts, although any one of a variety of microprocessors, microcomputers, and/or microcontrollers may be used alternatively. In one embodiment, processor 200 comprises a Z-Wave 700 series processor, such as a ZGM130S SIP Module, sometimes used in combination with a general purpose processor, in an embodiment that utilizes the Z-wave 700 protocol. Due to the relative small size of door/window sensor 104s, and the fact that most door/window sensor 104s are battery-powered, processor 200 is typically selected to have low power consumption, small in size, and inexpensive to purchase.

Memory 202 is coupled to processor 200 and comprises one or more information storage devices, such as RAM, ROM, flash, or other type of electronic, optical, or mechanical memory device. Memory 202 is used to store processor-executable instructions for operation of the door/window sensor 104 as well as any information used by processor 200, such as threshold information, parameter information, identification information, current or previous door or window status information, etc.

Detector 204 is coupled to processor 200 and reports, monitors or determines a state, physical condition, attribute, status, or parameter of something, such as the status of a door, window, gate, or other entrance or exit barrier (e.g., open, closed, locked, unlocked, etc.), a temperature, a humidity, motion, shock/vibration, glass breakage, etc. Detector 204 may comprise a reed switch, an ultrasonic transceiver, an infrared transceiver, a tilt sensor, an accelerometer, a motion sensor, microphone, or some other device to report, monitor or determine a state, physical condition, attribute, status, or parameter of a thing or area in proximity to a sensor.

Mesh-network transceiver 206 is coupled to processor 200 and comprises circuitry necessary to wirelessly transmit event signals and/or status messages between door/window sensor 104 and central controller 102, either directly or through one or more intermediate devices, such as repeater 103, commonly used in popular mesh networks. Mesh-network transceiver 206 also is configured to receive wireless messages sent from central controller 102 and/or other devices in security system 100, including relaying messages from one device to another or to central controller 102. Such circuitry is well known in the art and may comprise transceivers configured in accordance with a Z-Wave®, Zigbee®, RF4CE, 6LoWPAN, or WirelessHART EnOcean, ISAIOO.11a, or IEEE 802.15.4 protocol, or some other mesh network protocol. In one embodiment, mesh-network transceiver is integrated with processor 200 and memory 202, comprising the aforementioned ZGM130S SIP Module.

Tamper detection device 208 is coupled to processor 200 and is used to detect tampering with door/window sensor 104, for example, disabling door/window sensor 104, typically by removing a cover of door/window sensor 104 and removing the battery. Tamper detection device 208 typically comprises a switch that is depressed when a cover of door/window sensor 104 is installed over a reciprocal housing that contains the electronics of door/window sensor 104. The cover is typically manufactured with a physical protrusion that is designed to depress tamper detection device 208 when the cover has been installed. When the cover is removed, the switch changes state, causing processor 200 to detect this state change. In some embodiments, processor 200 "latches" any indication of tampering from tamper detection 208, noting the day and time that a tamper was detected, and stores this information in memory 202. In this way, processor 200 may indicate tampering to central controller 102 at a later time, thus potentially saving battery life.

Figure 3:
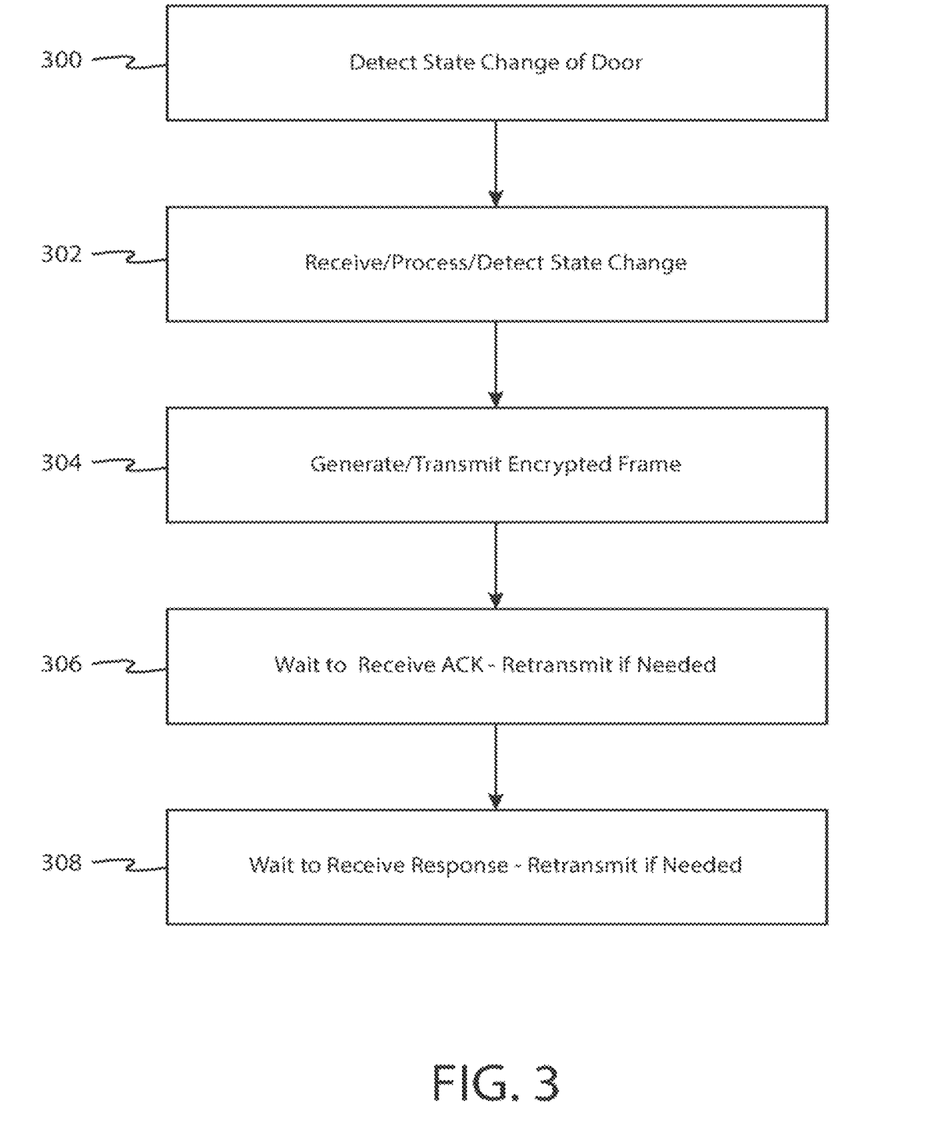
FIG. 3 is a flow diagram illustrating one embodiment of a method performed by the door/window sensor as shown in FIG. 2 for efficient transmission of messages to the central controller as shown in FIG. 1, either directly or indirectly via a repeater and/or other devices in the security system.

FIG. 3 is a flow diagram illustrating one embodiment of a method performed by door/window sensor 104 for efficient transmission of messages to central controller 102, either directly or indirectly via repeater 103 and/or other devices in security system 100. It should be understood that although the method is described in terms of a home security door or window sensor, the concepts described with respect to the method could be used in other types of security and non-security sensors, such as motion sensors, garage door tilt sensors, glass break detectors, shock sensors, cameras, temperature sensors, pressure sensors, or any type of wireless sensing device. It should be understood that in some embodiments, not all of the steps shown in FIG. 3 are performed. It should also be understood that the order in which the steps are carried out may be different in other embodiments.

At block 300, detector 204 detects that a door or window being monitored by door/window sensor 104 has changed state, i.e., has been opened or closed, typically when a reed switch inside detector 204 opens or closes as a result of a loss of a magnetic field produced by a magnet attached to the door or window. Upon detection of the changed state, detector 204 provides a signal to processor 200 indicative of the change.

At block 302, processor 200 receives the signal from detector 204, and in response, determines that an event is present, by processing the signal.

At block 304, processor 200 generates an encrypted data packet, or frame, in response to determining that an event has occurred, i.e., that the door has been opened. The encrypted frame comprises an encrypted portion and an unencrypted portion. The unencrypted portion comprises an identification of door/window sensor 104 and the encrypted portion comprises an event identification that identifies the type of event that has occurred. In one embodiment, encryption is performed using an S2 encryption method, well known in the art, although other types of encryption may be used alternatively. The identification of door/window sensor 104 comprises a unique identification number or other alpha-numeric sequence stored in memory 202, typically a serial number or, if door/window sensor 104 is configured in accordance with the Z-Wave 700 series protocol, a NodeID.

The event identification comprises, for a door or window sensor, a value that indicates when a door or window has been opened and, in some embodiments, when a door or window has been closed. Other events identifications may include an identification when a door or window has been locked or when a door or window has been unlocked. The event identification may, in some cases, also comprise a sensed reading, such as a temperature, pressure, humidity or other physical characteristic of an area proximate to a sensor. Similarly, in other sensor types, an event identifications may identify when motion is present or not in a motion detector, when a garage door has been opened or closed in a garage door sensor, etc. An identification of one or more of these events, typically in the form of a hexadecimal number, is stored in memory 202 for use by processor 200 to generate the encrypted frame.

In one embodiment, the encrypted frame comprises a double encapsulated command as defined by the Z-Wave protocol, with one encapsulation comprising a Supervision encapsulation and another encapsulation comprising an Encryption encapsulation. Encapsulation is defined as a placement, or "nesting", of one command or function into another. For example, a "Notification command" in accordance with the Z-Wave 700 series protocol may be the payload of a Supervision Get command, while the Supervision Get command may be the payload of an encryption command.

A Notification command is defined in the Z-Wave 700 series protocol, for providing event information to central controller 102. Other types of Z-wave 700 commands may be used instead of the Notification command, for example, commands that fall under a Barrier Operator command class, commands that fall under a Basic command class, commands that fall under a Binary Sensor command class, etc. The Z-Wave 700 series protocol offers numerous ways to convey event information to central controller 102.

In one embodiment, rather than generating a single command that identifies a particular event, as described above, it may be desirable to transmit other information as well. In this case, processor 200 may generate a single command that contains an identification of the event that occurred, plus one or more ancillary statuses of door/window sensor 104, or it may contain two or more ancillary status statuses without an event identification, as in the case of a status message. An "auxiliary status" is a state of a sensor other than its primary function. For example, a state of a battery (i.e., "low", remaining battery life, an actual or relative battery life, etc.) used by a door/window sensor is considered to be auxiliary status, as a battery status is auxiliary to the function detecting when a door or window has been opened by a door/window sensor. Similarly, a tamper status (i.e., whether a sensor has been tampered with) of a motion detector is an auxiliary status to the motion detector's primary function—to detect motion.

Bundling multiple statuses with transmission of an event identification may be used to limit the number of transmissions and to extend battery life. For example, if processor 200 determines that an event occurred, processor 200 may, in response, determine one or more auxiliary statuses of door/window sensor 104, such as whether the battery is low, an amount of remaining battery life, whether door/window sensor 104 has previously been tampered with as reported by tamper detection device 208, or, in general, a fault of some kind generated by processor 200 and stored in memory 202. In one embodiment utilizing the Z-wave 700 protocol, processor 200 generates a "Multi Command Encapsulated" command, which is one type of command from a "Multi Command Encapsulated command class" used to bundle multiple "commands" (i.e., event and status notifications) into a single encapsulation command.

Figure 4:
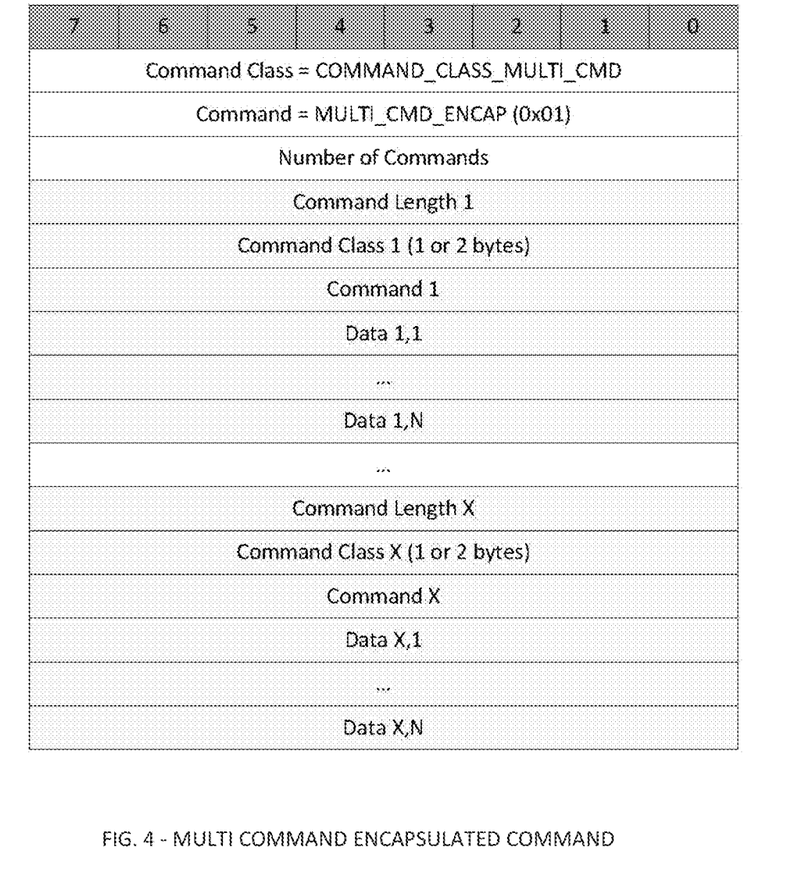
FIG. 4 shows the structure of a Multi Command Encapsulated command in accordance with a Z-Wave 700 series protocol.

FIG. 4 shows the structure of a Multi Command Encapsulated command, comprising x number of commands.

Figure 5:
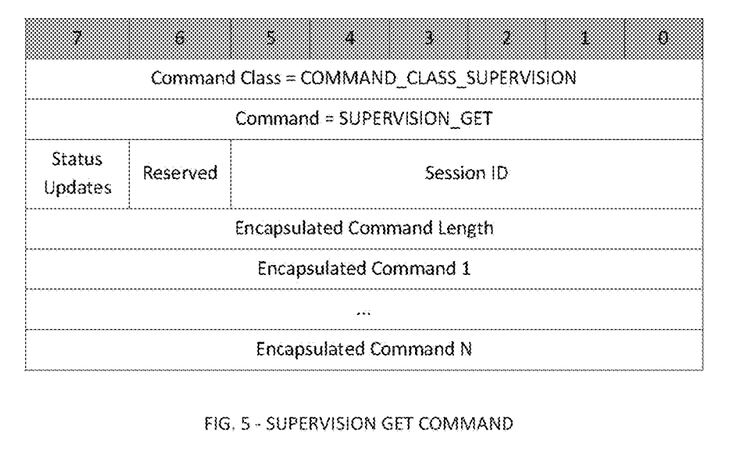
FIG. 5 shows the structure of a Supervision Get command in accordance with the Z-Wave protocol.

In any case, a single command or a Multi Command Encapsulated command may be inserted as a payload of a "Supervision Get" command as shown in FIG. 5. A Supervision Get command is a command defined by the Z-Wave 700 series protocol that requests an immediate and/or future status of a process initiated by the command. For example, when a door is opened, processor 200 generates an encrypted frame comprising the Notification command, which requires central controller 102 to respond to door/window sensor 104 with a response indicating that central controller 102 decrypted the Notification command successfully.

The Supervision Get command, comprising either a single command or a Multi Command Encapsulated command, is then encrypted by processor 200, in one embodiment, in accordance with S2 encryption defined by the Z-Wave 700 series protocol, which is a framework for allowing devices to communicate securely in a Z-wave 700 network. In this embodiment, processor 200 encrypts the Supervisory Get command using one of several available encryption types, such as AES-128, and then places the encrypted result into a Security 2 Message Encapsulation command as its payload.

Figure 6:
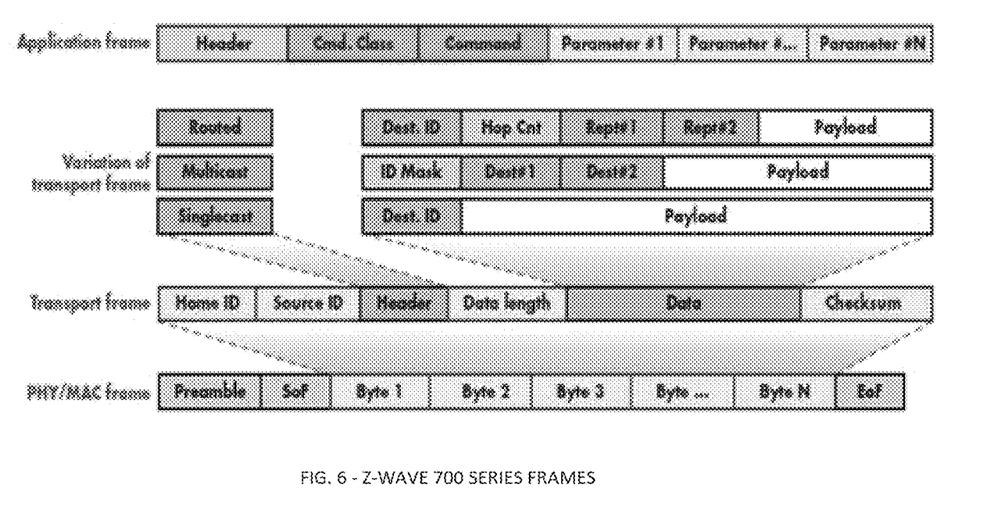
FIG. 6 shows the structure of a transport frame in accordance with the Z-Wave 700 series protocol.

Once the Security 2 Message Encapsulation command has been created, processor 200 creates a transport frame, as shown in FIG. 6, comprising an unencrypted Preamble, an unencrypted Home ID of system 100, an unencrypted Source ID (i.e., an identification of door/window sensor 104 in system 100), an unencrypted a Data Length indicating the length of the transport frame, the encrypted Supervision Get command, and an unencrypted Checksum.

Once the transport frame has been constructed, processor 200 generates an encrypted PHY/MAC frame, also shown in FIG. 6, comprising a Start of Frame (SOF) symbol, frame data (i.e., the encrypted Supervision Get command and the unencrypted other data, such as Home ID, Source ID, etc.) and an End of Frame (EOF) symbol. The frame data is the encrypted Supervision Get command contained in the Security 2 Message Encapsulation command.

After the encrypted PHY/MAC frame has been generated, processor 200 causes it to be transmitted by mesh-network transceiver 206, either directly to central controller 102, or to another device in system 100 for relaying the encrypted PHY/MAC frame to central controller 102.

At block 306, processor 200 waits a configurable, predetermined time to receive an acknowledgement from central controller 102, either directly or via one or more other devices, that the encrypted PHY/MAC frame was successfully received. Successful reception by central controller 102 may mean that the encrypted PHY/MAC frame was received without an error in the checksum of the transport frame, or by using some other technique well-known in the art. If an acknowledgement from central controller 102 is not received within the configurable, predetermined time, then processor 200 retransmits the encrypted PHY/MAC frame. This cycle continues for a configurable, predetermined number of times until either an acknowledgement is received from central controller 102, or mesh-network transceiver 206 has retransmitted the PHY/MAC frame the configurable, predetermined number of times, at which point processor 200 ceases in any further attempts to transmit the encrypted PHY/MAC frame. For example, processor 200 may wait five seconds after transmitting an original PHY/MAC frame or retransmission and retransmit 10 times if no acknowledgement is received. In another embodiment, processor 200 may wait a variable amount of time before retransmitting each, successive retransmission, i.e., a first retransmission may occur after waiting 5 seconds from retransmission of the PHY/MAC, then wait 10 seconds after another retransmission, then wait 15 seconds after another transmission, etc. A random amount of time is also generally added to these wait times, in order to avoid collisions between other transmitting devices in system 100, on the order of tens or hundreds of milliseconds.

At block 308, after an acknowledgement is received from central controller 102, processor 200 waits a configurable, predetermined time period (which may be different than the configurable, predetermined time period, described above, to wait for acknowledgements) to receive a response to the encrypted PHY/MAC frame, in a Z-Wave 700 series embodiment referred to as a Supervision Report. The response is different than the acknowledgement: the response indicates that the information in the encrypted PHY/MAC frame has been successfully decrypted or, more generally, that central controller 102 has taken an action in response to receiving the PHY/MAC frame (such as causing a siren to sound, alerting a remote monitoring center, alerting an individual via SMS messaging, etc.), and therefore the information in the encrypted PHY/MAC was properly conveyed to central controller 102. If a response from central controller 102 is not received within the configurable, predetermined time, then processor 200 retransmits the encrypted PHY/MAC frame and then processor 200 waits for an acknowledgement from central controller 102, as before. This cycle continues for a configurable, predetermined number of times until either a response is received from central controller 102, or mesh-network transceiver 206 has retransmitted PHY/MAC frame the configurable, predetermined number of times. For example, if the number of retransmissions for acknowledgements is set to 3, and the number of retransmissions for responses is set to 4, and if processor 200 receives an acknowledgement after the second retransmission, processor 200 may transmit the original encrypted PHY/MAC frame a total of 5 times (original transmission plus 4 more retransmissions) before processor 200 ceases any more attempts to transmit the encrypted frame.

The configurable, predetermined times discussed with respect to either acknowledgements, responses, or both, may be actively managed by processor 200 to account for actual, round-trip times between when an event or status signal is transmitted by door/window sensor 104 and when an acknowledgement and/or a response is received. Round-trip times may vary, depending on whether door/window sensor 104 communicates directly with central controller 102 (resulting in relatively fast round-trip times) or whether door/window sensor 104 must communicate through one or more repeaters and/or other mesh devices in system 100 to reach central controller 102 (resulting in longer round-trip times due to the additional processing required by each repeating device). In one embodiment, processor 200 determines one or more round-trip times for respective acknowledgements and/or responses after transmission/retransmission of event or status signals, and stores the results in memory 202. Then, processor 200 may determine an expected response-time based on the results. For example, processor 200 may average the round-trip time of the last 5 transmission and use the average as the predetermined time to wait for acknowledgements and/responses, use a last-recorded round-trip time as the predetermined time, use a median of a previous 10 round-trip times, etc.

Figure 7A:
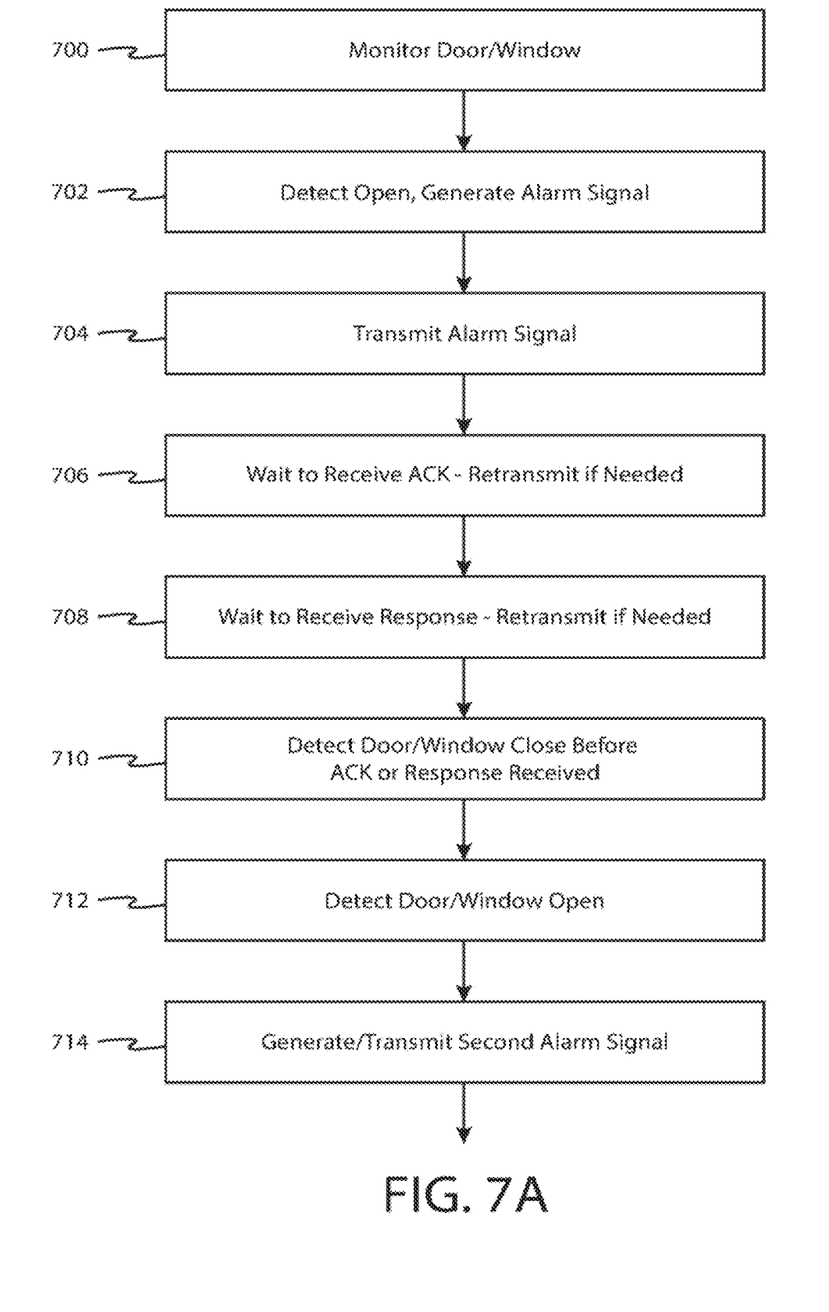
FIG. 7 is a flow diagram illustrating a method performed by the door/window sensor shown in FIG. 2 for stopping an intruder from quickly opening then closing a door or window monitored by the door/window sensor without begin detected.
Figure 7B:
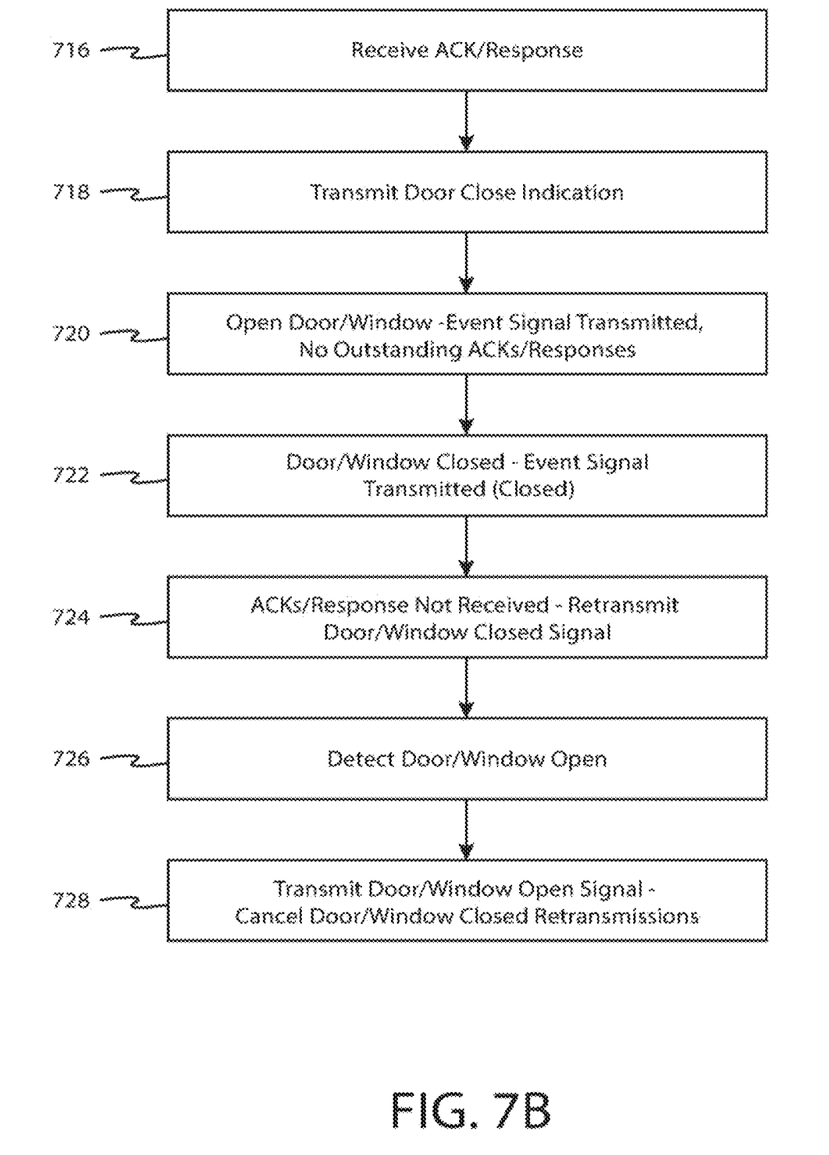

FIG. 7 is a flow diagram illustrating a method performed by door/window sensor 104 for stopping an intruder from quickly opening then closing a door monitored by door/window sensor 104, without being detected. It should be understood that in some embodiments, not all of the steps shown in FIG. 7 are performed, and that the order in which the steps are carried out may be different in other embodiments.

In some prior art security systems, a door/window sensor typically sends a signal when it detects that a door or window has been opened. However, for a variety of reasons, the signal may not be received by a central controller. An intruder may quickly close the door or window, causing the door/window sensor to transmit another signal, indicating that the door or window is closed. Thus, the central controller fails to detect the intruder, because the signal indicating "closed" may be received without the central controller ever receiving the initial signal that the door or window had been opened. The method described by FIG. 7 eliminates this problem.

At block 700, door/window sensor 104 is monitoring a door and operating normally, in communication with central controller 102, either directly or via one or more other sensors and/or repeaters, which is in an armed-home or armed-away state. In an armed-home state, perimeter sensors (such as door/window sensors, garage door tilt sensors, etc.) are monitored, while indoor motion sensors are not.

At block 702, an intruder opens the door, and in response, processor 200 generates an event signal with a code that indicates that the door has been opened. In one embodiment, the event signal comprises an encrypted, double-encapsulated Z-wave 700 command, as described above, with the event identification indicating that the door has been opened. In this embodiment, a response from central controller 102 is expected that indicates that the "open" event was successfully decrypted, as the double-encapsulated command comprises the Supervision Get command requiring a response from central controller 102.

At block 704 processor 200 causes transceiver 206 to transmit the event signal.

At block 706, processor 200 waits to a configurable, predetermined time to receive an acknowledgement from central controller 102, either directly or via one or more other devices, that the event signal was successfully received, as described above. If an acknowledgement from central controller 102 is not received within the configurable, predetermined time, then processor 200 retransmits the event signal. This cycle continues for a configurable, predetermined number of times until either an acknowledgement is received from central controller 102, or the event signal has retransmitted the configurable, predetermined number of times, at which point processor 200 ceases in any further attempts to transmit the event signal.

At block 708, after an acknowledgement is received from central controller 102, processor 200 waits a configurable, predetermined time period (which may be different than the configurable, predetermined time period, described above, to wait for acknowledgements) to receive a response to the event signal. In an embodiment utilizing the Z-Wave protocol, the response is referred to as a Supervision Report. The response is different than the acknowledgement: the response indicates that the information in the event signal has been successfully decrypted or, more generally, that central controller 102 has taken an action in response to receiving the event signal (such as causing a siren to sound, alerting a remote monitoring center, alerting an individual via SMS messaging, etc.), and therefore the information in the event signal was properly conveyed to central controller 102. If a response from central controller 102 is not received within the configurable, predetermined time, then processor 200 retransmits the event signal. This cycle continues for a configurable, predetermined number of times until either a response is received from central controller 102, or the event signal has been retransmitted the configurable, predetermined number of times.

At block 710, while waiting for an acknowledgement and a response from central controller 102, the door is closed.

Processor 200 detects the door closure as detector 204 changes state. However, processor 200 does not immediately generate and transmit a signal indicating to central controller 102 that the door has been closed. Rather, processor 200 first determines whether any open event signals are outstanding, i.e., that both an acknowledgement and a response have not been received for any open event signals sent in the recent past. If no open event signals are outstanding, processor 200 immediately thereafter causes mesh-network transceiver 206 to transmit the closed event signal. If there are any outstanding open event signals, i.e., signals that have yet to be acknowledged and/or responded to by central controller 102, processor 200 stores an indication of the door closure in memory 202, typically also storing the time and date that the closure occurred, and does not transmit the closed event signal.

At block 712, while still waiting for an acknowledgement and/or a response from central controller 102 as a result of the first door opening, and during any retransmission attempts, if the door is opened again, processor 200 detects the opening as detector 204 changes state.

At block 714, in response to sensor 204 changing state, i.e., a door or window is opened again, processor 200 immediately generates a second event signal indicative of the state change and causes transceiver 206 to immediately transmit the second event signal to central controller 102. The second event signal is transmitted while the door closed indication is still resident in memory 202. In one embodiment, after the second event signal is transmitted, processor 200 erases the indication stored in memory 202 of the door closure. In another embodiment, processor 200 erases the indication stored in memory 202 of the door closure only after receiving an acknowledgement from central controller 102 that the second event signal was received. In yet another embodiment, utilizing the Z-Wave 700 series protocol, processor 200 erases the indication stored in memory 202 of the door closure only after receiving both an acknowledgment and a response from central controller 102.

At block 716, an acknowledgement is received from central controller 102 by transceiver 206 as a result of transmitting the first event signal or the second event signal, or any retransmissions associated with either signal. In one embodiment, processor 200 additionally receives a response from central controller 102, in accordance with the Z-Wave 700 series protocol.

At block 718, only after receiving the response from central controller 102, processor 200 may cause transceiver 206 to transmit the indication stored in memory 202, indicative of the door closure that occurred at block 710. This may be performed for record-keeping purposes of central controller 102, or to alert a user that an anomaly occurred (i.e., that a door closure occurred before either the first or second event signal was received and/or the door was first opened). In an embodiment utilizing the Z-Wave 700 series protocol, the indication is transmitted only after receiving both an acknowledgement and a response from central controller 102.

In one embodiment, at block 720, when a door or window is closed, and there are no outstanding acknowledgements or responses, i.e., any door open or closed signals have been acknowledged and responded to by central controller 102, the door or window may be opened, prompting processor 200 to cause transmission of a door or window open signal by mesh-network transceiver 206, as described above. Processor 200 receives an acknowledgement and a response from central controller 102, also described above.

At block 722, the door or window is closed, causing processor 200 to transmit a door or window closed signal (i.e., event signal).

At block 724, if the door/window closed signal is not acknowledged and/or responded to, processor 200 retransmits the door/window closed signal.

At block 726, before processor 200 receives an acknowledgement and/or a response from central controller 102, either during the initial door/window closed signal transmission or subsequent re-transmissions, processor 200 may detect, via detector 204, that the door or window has been opened.

At block 728, in response to detecting the door or window being opened, processor 200 stops any further retransmission of the door/window closed signal and transmits a door/window open signal to central controller 102. In this way, door or window openings are given a higher priority than door or window closings, because door or window openings may indicate an unauthorized intrusion, while door or window closings may or may not indicate such an unauthorized intrusion.

The same prioritization scheme may be implemented vis-à-vis other events or states determined by door/window sensor 104. For example, if processor 200 has transmitted a door/window open or closed command, and is awaiting an acknowledgement and/or response from central controller 102, and then processor 200 detects tampering with door/window sensor 102 via tamper detection device, processor 200 may immediately stop any further retransmissions of the door/window open or close signal, and immediately transmit a tamper signal. Similarly, door/window open or close signals may be prioritized over other transmissions, such as a battery report signal (indicating remaining battery life) or wake up notifications.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method, performed by a wireless sensor for efficient message transmission by the wireless sensor, comprising:

using a public key received from the controller during a public key exchange with the controller to establish a shared secret;

determining, by a processor, an occurrence of an event in proximity to the wireless sensor via a signal received from a detector coupled to the processor, the event causing a change in a state of a barrier being monitored by the wireless sensor;

in response to determining that the event has occurred, using, by the processor, the shared secret to generate an encrypted frame, comprising an unencrypted, unique identification of the wireless sensor and an encrypted event identification that identifies the state of the barrier resulting from the event that has occurred;

transmitting, by the processor via a mesh-network transceiver coupled to the processor, the encrypted frame;

determining, by the processor, an occurrence of a further event in proximity to the wireless sensor via a further signal received from the detector coupled to the processor, the further event causing a subsequent change in a state of the barrier being monitored by the wireless sensor;

determining, by the processor via the mesh-network transceiver, whether a first message from a central controller in communication with the wireless sensor that the encrypted frame was received;

determining, by the processor via the mesh-network transceiver, whether a second message, transmitted separately from the first message, from the controller that the frame was decrypted successfully was received; and in response to determining that the further event has occurred and only when both the first message and the second message have been determined to be received, using, by the processor, the shared secret to generate a further encrypted frame, comprising the unencrypted, unique identification of the wireless sensor and an encrypted event identification that identifies the subsequent state of the barrier resulting from the further event that has occurred.

2. The method as recited in claim 1, wherein the encrypted frame further comprises an unencrypted preamble, an unencrypted system identification, an unencrypted indication of a length of the encrypted frame, and an unencrypted checksum.

* * * * *